H. D. STERRICK.
PICTURE MOUNT.
APPLICATION FILED DEC. 14, 1906.

No. 912,329.

Patented Feb. 16, 1909.

Witness:
Chas. S. Lepley.
E. R. Rodd.

Inventor,
Harrison D. Sterrick
By F. W. H. Clay
att'y.

UNITED STATES PATENT OFFICE.

HARRISON D. STERRICK, OF PITTSBURG, PENNSYLVANIA.

PICTURE-MOUNT.

No. 912,326.  Specification of Letters Patent.  Patented Feb. 16, 1909.

Application filed December 14, 1906. Serial No. 347,766.

*To all whom it may concern:*

Be it known that I, HARRISON D. STERRICK, a citizen of the United States, residing at Pittsburg, in the State of Pennsylvania, have invented certain new and useful Improvements in Picture-Mounts, of which the following is a specification.

My invention relates to picture glasses, and its primary object is to provide a combined glass and mount for the picture which will give a medallion appearance to a paper picture mounted thereon.

Other objects are to provide a glass which will serve as an ornamental frame and as a mount for the picture, and to provide means for giving a flat picture the appearance of a raised medallion, by means of a lens and its effect on the light reflected from the picture.

Figure 1:
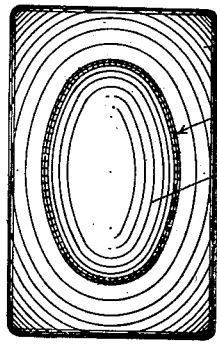
Figure 2:
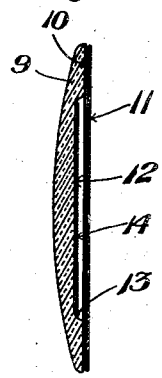
Figure 3:
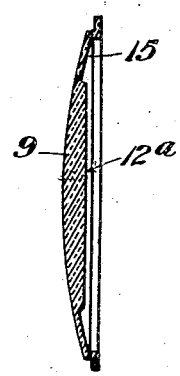
Figure 5:
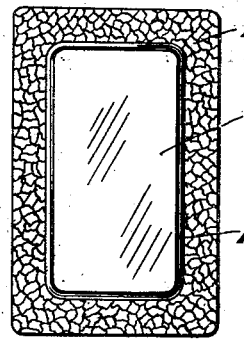
Figure 6:
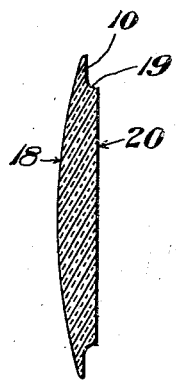
Figure 4:
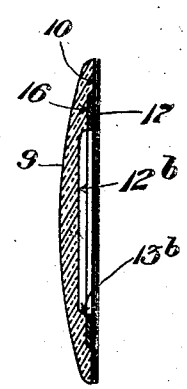
Figure 7:
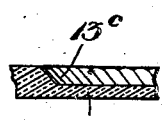
Figure 8:
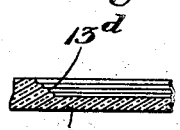

The accompanying drawing shows several preferred forms of the device, Figure 1 being a front view and Fig. 2 a central vertical section of a preferred form. Figs. 3, 4 and 6 are similar sections of modified forms of the mount, and Fig. 5 shows a back view of an alternate form for the mounting surface of the picture. Figs. 7 and 8 are details of partial sections showing the surface of the glass surrounding the picture supporting surface.

It will be recognized that it is difficult, if not impossible, to paste a picture such as a photograph on a curved surface, and also that a raised or medallion appearance cannot be given to the picture without either pasting it on a curved surface or using a lens in immediate contact with the picture.

Picture frames have heretofore been made with oval shaped glasses not in contact with the picture, but the medallion effect is not good because the light reflected from the picture is not refracted in the proper direction nor at the proper time.

In my device I provide a transparent plate 9 made preferably of glass which will serve at once as an ornamental frame for the picture, a lens, and as a mount for pasting the picture immediately thereon. It is made generally flat behind with a flat face 10 (Fig. 2) for pasting a protecting cover 11, and the front of the glass is made in a general spherical form so as to provide a lens. The surface 10 is usually enameled, as in Fig. 5. On the back of the plate 9 is a countersunk flat portion 12 which is surrounded by a curved surface 13 separated by a sharp edge and, which may be either plain as shown in Fig. 2 or ornamented with beads or striations as shown in Figs. 7 and 8. The paper containing the picture, 14, is pasted on this flat surface 12 with its edges just meeting the curved surface 13. Looked at from the front, the light will be reflected from the picture immediately through the lens and dispersed angularly, so that the flat picture will appear as a medallion. At the same time the portion of the lens over the flat back 10 being curved will give that portion the appearance also of a medallion. This surface is ornamented as by pasting mother of pearl or metal paint thereon. The effect therefore is for the picture to appear as a medallion mounted upon an ornamental convex surface, which gives a very striking and pleasing effect.

In the form of Fig. 3 a glass plate may be made with parallel surfaces as at 15 and the flat surface for pasting the picture, 12ª, will be raised rather than depressed, which gives a heavy lens on the picture with some economy of the glass, and also makes the backing under the part 15 appear as of different curvature from the curvature of the picture. In Fig. 4 is shown still another form in which the lens plate 9 has three flat surfaces on the back, separated by sharp corners so that the protecting cover pasted on surface 10, and a common photo mount 17 on the surface 16, may be placed behind the picture on the surface 12ᵇ. This gives the appearance from the front of two convex surfaces mounted on a third convex surface which increases the medallion effect and also allows of more elaborate ornamentation of the curved surrounding surfaces 13ᵇ and painting on any of the surfaces, the edges separating the spaces for depositing paint so as to make its application easy.

Of course the glass frame and mount may within the scope of the appended claims be of any design desired, and another form is shown in Figs. 5 and 6. Also in Fig. 6 the lens 18 has an outwardly slanting and curved surface 19 on the back, and the surface for mounting the flat picture, 20, is raised rather than depressed. This gives the effect of a medallion rising from the depression in a hollow lens. The ornamentation such as suggested in Figs. 7 and 8 may be applied to any one of the surfaces 13, 19, etc. so as to make an ornamental border to the picture and the edge of the medallion.

This is usually done by gluing material like mother of pearl or metallic paint on the surface. The glass gives it a polished metal appearance and it will be noted that the mount is not only a lens to give the medallion effect to the picture, but these integral extensions of the lens furnish spaces giving the appearance of a frame having ornamentation of various kinds, which ornamental material may readily be deposited on the distinct surfaces and viewed from the front will appear as being highly polished.

The advantages of these devices will be readily apparent to those familiar with the effect of refraction and reflection and the evident economy involved in using the picture mount as a frame by making the appearance of the border distinctly different from the appearance of the lens over the picture, will also be apparent.

Having thus described my invention and illustrated its use, what I claim as new and desire to secure by Letters Patent is the following:

1. A combined picture glass and frame formed of a lens having a flat back and an integral flat flange surrounding the back, the center of the article being adapted for pasting a picture thereon in flat condition, and the surfaces of the flat flange and the picture space being separated by sharp edges whereby paint and ornamentation may be easily applied and will appear through the lens as embossed ornamentation around the picture space forming a frame therefor.

2. A picture mount comprising an integral piece of glass having a curved front surface to form a lens, an integral lateral flange, and a central flat space for pasting pictures, the surface of the back being divided by sharp edges to provide spaces for depositing paint or other ornamentation, whereby the flange will appear as an ornamented frame with a picture pasted in the middle.

In testimony whereof I have hereunto signed my name in the presence of the two subscribed witnesses.

HARRISON D. STERRICK.

In presence of—
 CHAS. S. LEPLEY,
 F. W. H. CLAY.